United States Patent [19]

Collonia

[11] 4,254,844
[45] Mar. 10, 1981

[54] OVERRIDE CONTROLLER FOR AUTOMATIC MOTOR VEHICLE SPEED CONTROL

[75] Inventor: Harald Collonia, Königstein, Fed. Rep. of Germany

[73] Assignee: VDO Adolf Schindling AG, Frankfurt am Main, Fed. Rep. of Germany

[21] Appl. No.: 967,381

[22] Filed: Dec. 7, 1978

[30] Foreign Application Priority Data

Dec. 12, 1977 [DE] Fed. Rep. of Germany ....... 2755370

[51] Int. Cl.³ ...................... B60K 31/00; F02D 11/10
[52] U.S. Cl. .................................. 180/179; 123/350; 123/361; 192/0.058; 192/3 M; 74/860
[58] Field of Search ................. 180/178, 179; 123/102

[56] References Cited
U.S. PATENT DOCUMENTS

| 4,084,659 | 4/1978 | Abend et al. | 180/179 |
| 4,117,903 | 10/1978 | Fleischer et al. | 123/102 X |
| 4,140,202 | 2/1979 | Noddings et al. | 180/179 |

*Primary Examiner*—Robert J. Spar
*Assistant Examiner*—Edward M. Wacyra
*Attorney, Agent, or Firm*—Martin A. Farber

[57] ABSTRACT

Device for controlling of the traveling speed of a motor vehicle with an electrical controller, which controller, by an electrical adjusting device in dependency on a desired value which is fed-in or stored by the driver via one or more manually actuatable first actuating elements, acts on an element which influences the ratio of the fuel-air mixture fed to the motor vehicle, particularly the throttle valve, and its adjusting device is switchable inoperatively off by second actuating elements. Elements are provided by which the controller can be turned off if at least one first actuating element and at least one second actuating element are in their active position or condition.

1 Claim, 1 Drawing Figure

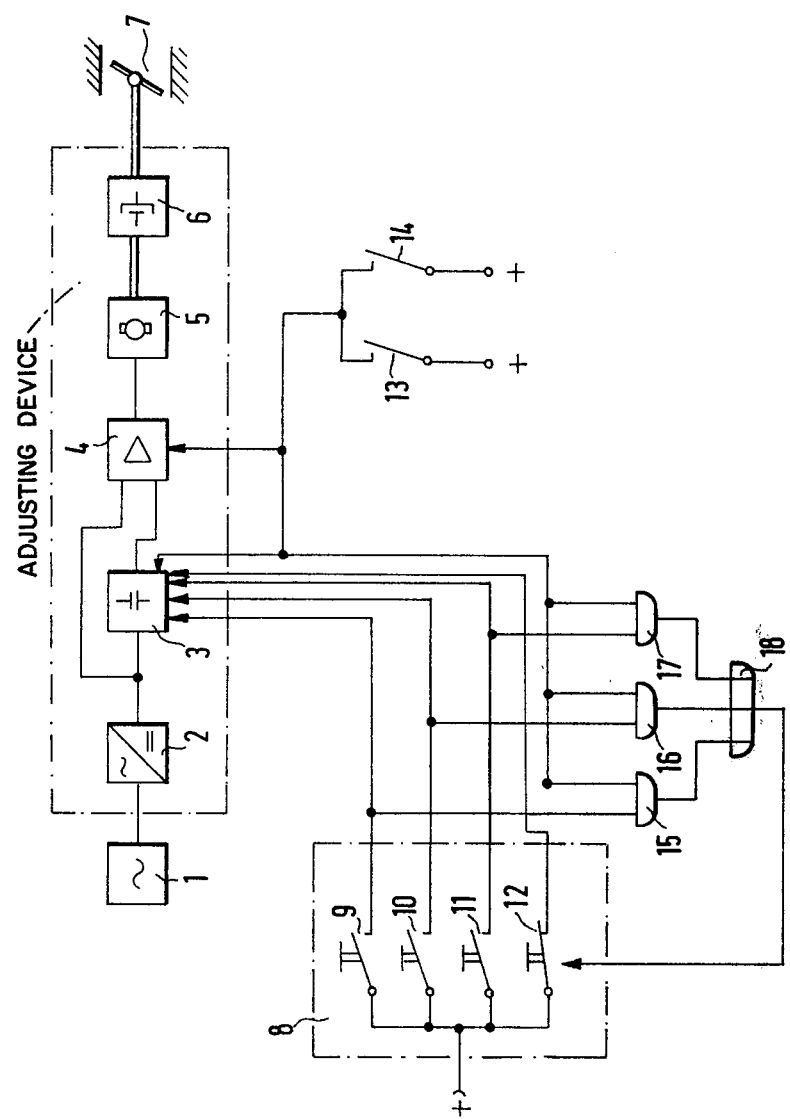

OVERRIDE CONTROLLER FOR AUTOMATIC MOTOR VEHICLE SPEED CONTROL

The invention relates to a device for controlling of the traveling speed of a motor vehicle with an electrical controller, which controller, by means of an electrical adjusting device in dependency on a desired value which is fed-in or stored by the driver via one or more manually actuatable first actuating elements, acts on an element which influences the ratio of the fuel-air mixture fed to the motor vehicle, particularly the throttle valve, and its adjusting device is switchable inoperatively off by means of second actuating elements.

With one known device of this type (German Offenlegungsschrift OS No. 25 11 609) several manually actuatable first switches are arranged in a servicing or operating unit and two switches are present. One of these switches is operatively connected with the clutch and the other is operatively connected with the brake. The switches which are located in the service unit 19, and which are formed as touch contact or key switches, serve for switching the control unit on during a certain desired traveling speed, whereby the controller holds this traveling speed constant, for increasing the desired speed without actuation of the gas pedal, for reduction of the desired speed without actuation of the brake and for increasing or decreasing the speed to an input in a memory read-in desired value. The switch which stands in operative connection with the clutch is necessary in order to turn the control device off during a gear shifting operation. In the same manner the switch which stands in operative connection with the brake insures that as soon as the brake is actuated the control device is taken out of operation.

As has been shown, under circumstances it can occur that a switch which is arranged in the operating or service unit sticks or seizes or a connecting or shorting link arises by means of an inner destruction of the switch. By means of this shorting link the controller is continuously applied with a signal of the function associated with this switch. This can relate for example to the acceleration switch or the restart switch, by which switch the vehicle can be accelerated to a desired speed which has been previously read-in or stored in the memory, so that dangerous traffic situations or indeed accidents can occur with personal or property damage.

It is an object of the present invention to avoid this considerable disadvantage.

It is another object of the present invention to improve the functioning security of the known devices and indeed particularly with respect to a possible sticking or locking of the individual switches in the service unit.

It is another object of the present invention to aid the solution of the above-mentioned objective by providing means (e.g., 15, 16, 17, 18) by which the controller is able to be turned off or disconnected when at least one first actuating element (e.g., 9, 10, 11) and at least one second actuating element (13, 14) are in their active position or condition.

The invention starts out from the consideration that in the normal operation the driver will not simultaneously actuate a switch in the service unit and the clutch and/or the brake. If thus such an abnormal switch configuration occurs during the control operation, this is an indication that one of the switches, or respectively, one of the circuits which are connected with these switches is not in order. The consequence is that the control device is turned off. Dangerous traffic situations or indeed accidents due to sticking, catching switches etc. are thus surely and safely prevented. A particular advantage of the invention resides in that its realization is possible with an exceptionally small cost. According to one advantageous embodiment of the invention the realization can take place in that to each of the individual first actuating elements (9, 10, 11) there is coordinated an AND member (15, 16, 17), respectively, one input of the latter being connected with the respective actuating element (9, 10, 11), the other input thereof being connected with the second actuating elements (13, 14), and the outputs of all AND members (15, 16, 17) respectively each are connected to one input of an EITHER-OR member (18), the output of the latter acting on a switch (12), which switch switches the controller inoperatively off. Such an embodiment has the advantage that it may be realized with a particularly low expenditure.

With the above and other objects and advantages in view, the present invention will become more clearly understood in connection with the detailed description of a preferred embodiment, when considered with the accompanying drawing, of which the only FIGURE illustrates an embodiment of a device for controlling the traveling speed of a motor vehicle in accordance with the present invention.

Referring now to the drawing, the traveling speed control device contains a speed transmitter or pickup 1, the output signal of which has a frequency proportional to the traveling or driving speed, and a frequency-voltage-transformer or transducer 2 which is connected following the transmitter 1. The output signal of the transformer 2 on the one hand is fed directly to a differential amplifier 4 and on the other hand is fed indirectly to the differential amplifier 4 via a memory or storage unit 3 for the desired value of the speed. In the differential amplifier 4 the prevailing actual speed value at the time is compared with the desired value of the speed. In the event of a deviation of the actual value from the desired value the potential in the output of the comparator increases or decreases. The comparator output acts on a drive stage 5 with a servomotor. The drive stage 5 and respectively its servomotor, is mechanically connected with the throttle valve 7 by means of a coupling or clutch 6.

The control of the control device in the manner considered as proper by the driver based on the traffic conditions is brought about via an operating or service unit 8 which contains four switches 9, 10, 11 and 12. With the switch 12 the control device may be turned on and off, respectively. By the switch 9, with a turned on control device, the vehicle may be accelerated to a desired speed without actuation of the gas pedal. With the switch 10 the traveling speed of the motor vehicle can be reduced to a certain value without actuation of the brake. The switch 11 serves for restarting or returning of a preselected speed value which has been stored or read into the memory 3. The touch contact switch 11 generally is actuated when for example due to a braking operation the control device was switched off and again after the braking operation the driver once more desires to travel with the previous traveling controlled speed.

In addition to the switching off or disconnection possibility for the control device, which switching off possibility is provided by the switch 12, two additional switches 13 and 14 are provided. One of these switches stands in operative connection with the clutch, and the other of these switches is in operative connection with the brake. By these switches it is guaranteed that during a switching or shifting operation or upon a braking operation the control device is automatically taken out of operation. As evident, the controlling of the control device takes place by applying the control device at certain positions with positive voltage signals.

For monitoring of the suitable or proper functioning of the switches 9, 10 and 11, three AND gates 15, 16 and 17 are provided, each of the latter with one input thereof, respectively, being connected to one switch output and with their other inputs respectively are connected to the switches 13 and 14. The outputs of the AND gates 15, 16 and 17 are connected to the inputs of an OR gate 18. The output of the OR gate acts on the switch 12. As soon as one of the switches 9, 10 or 11 sticks or catches, etc., and consequently a positive potential continuously stands in line at its output and the driver actuates the brake or the clutch, the function or condition of that AND member which is associated and coordinated to this switch is met and the OR gate 18 sends an output signal to the switch 12, which switch 12 is actuated in the sense or manner of turning the control device off.

While there has been disclosed one embodiment of the invention, it is to be understood that this embodiment is given by example only and not in a limiting sense.

I claim:

1. In a device for controlling the traveling speed of a motor vehicle with an electrical controller, which controller, by means of an electrical adjusting device in dependency on a desired value which is fed-in by the driver via at least one manually actuatable first actuating elements, acts on an element which influences the ratio of the fuel-air mixture fed to the motor vehicle, particularly the throttle valve, and its adjusting device is switchable inoperatively off by means of second actuating elements, the improvement comprising means for turning the controller off when at least one of the first actuating elements and at least one of the second actuating elements are in their active position, said means for turning the controller off comprises, a plurality of AND gates respectively coordinated to each of individual of said first actuating elements, one input of each of said AND gates is connected with the respective said first actuating elements and the other input of each said AND gates is connected with said second actuating elements, an OR gate has a plurality of inputs respectively connected to the outputs of all of said AND gates, respectively, and switch means operatively connected to the output of said OR gate, said switch means for switching the controller off.

* * * * *